United States Patent [19]
Juchinewicz

[11] Patent Number: 6,053,677
[45] Date of Patent: Apr. 25, 2000

[54] APPARATUS FOR SUPPORTING KEYS AND KEY BLANKS DURING CUTTING THEREOF

[75] Inventor: Vincent Juchinewicz, Salem, Va.

[73] Assignee: Medeco Security Locks, Inc., Salem, Va.

[21] Appl. No.: 08/856,755

[22] Filed: May 15, 1997

Related U.S. Application Data

[62] Division of application No. 08/529,103, Sep. 15, 1995, Pat. No. 5,671,523.

[51] Int. Cl.⁷ ....................................................... B23C 3/35
[52] U.S. Cl. ............................... 409/81; 29/76 C; 76/110
[58] Field of Search ........................ 409/81–83; 29/76 C; 76/110

[56] References Cited

U.S. PATENT DOCUMENTS

| | | | |
|---|---|---|---|
| 1,165,099 | 12/1915 | Hoernel | 409/81 |
| 4,525,908 | 7/1985 | Bernstein | 29/76 C |
| 4,614,465 | 9/1986 | Wu | 409/81 |
| 4,687,389 | 8/1987 | Santii et al. | 409/81 |
| 5,167,171 | 12/1992 | Heredia | 76/110 |
| 5,176,015 | 1/1993 | Sussina | 70/369 |

FOREIGN PATENT DOCUMENTS

| | | | |
|---|---|---|---|
| 362007 | 4/1990 | European Pat. Off. | 409/81 |
| 1186432 | 8/1959 | France | 409/81 |
| 1414033 | 1/1966 | France | 409/81 |
| 2538733 | 7/1984 | France | 409/81 |
| 1239910 | 5/1967 | Germany | 409/81 |

*Primary Examiner*—William Briggs
*Attorney, Agent, or Firm*—Rothwell, Figg, Ernst & Kurz

[57] ABSTRACT

An apparatus and method for supporting angled or chevron-shaped keys or key blanks during cutting of bit surfaces in the blade portions thereof. The angled key blank is supported at the intermediate horizontal ledge portion thereof such that the upper portion of the key which is to be cut is oriented in a horizontal manner so as to be properly engaged by the cutting mechanism. The apparatus may include a plurality of lower vice jaws each of which is configured to support a particular angled key blank, or it may include a plurality of detachable inserts that form part of a modular system which allows a single lower vice jaw to detachably receive any of various inserts, thereby permitting the jaw to support various angled key blanks. A support member also is provided which may be utilized on preexisting vice jaws of a key cutting machine to permit the machine to be modified so as to properly support and cut bit surfaces into the upper portion of an angled key blank.

3 Claims, 13 Drawing Sheets

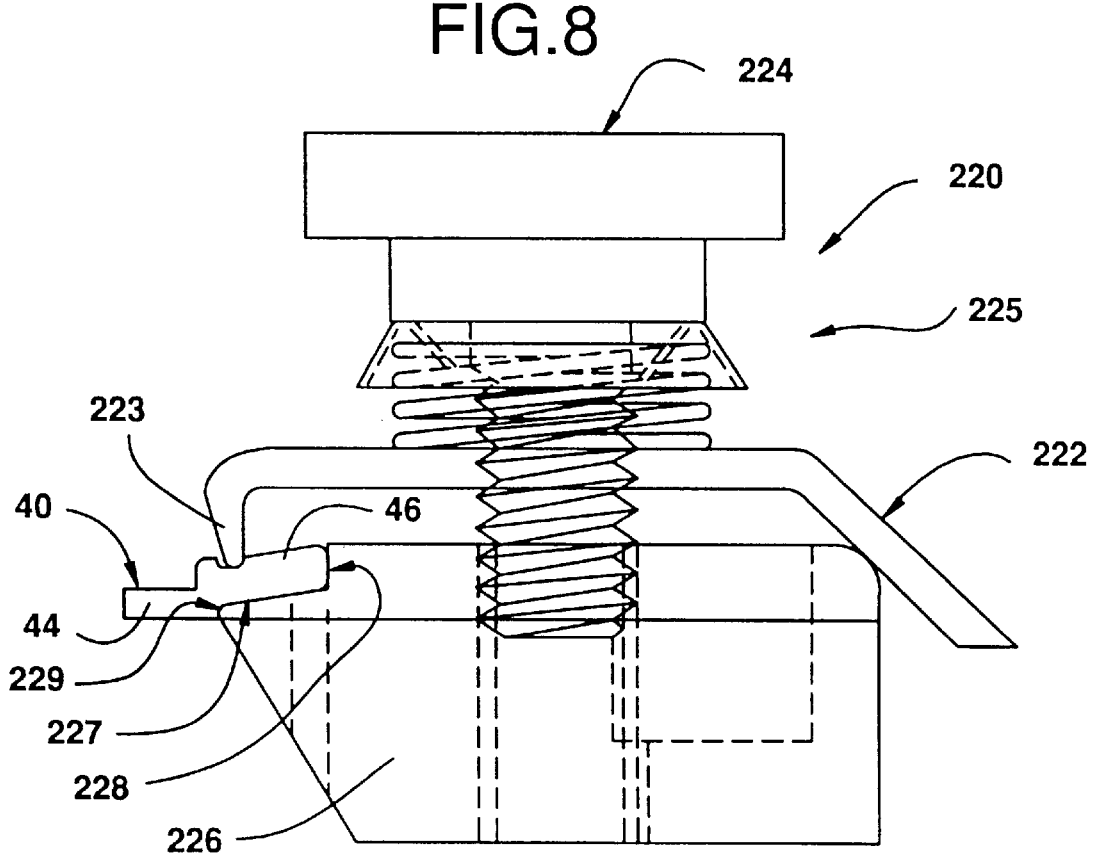

APPARATUS FOR SUPPORTING KEYS AND KEY BLANKS DURING CUTTING THEREOF

This is a divisional of application Ser. No. 08/529,103, filed Sept. 15, 1995, now U.S. Pat. No. 5,671,523.

BACKGROUND OF THE INVENTION

1. Field of the Invention

The present invention relates generally to an apparatus for supporting keys or key blanks during the cutting of bit surfaces into the blade thereof. More particularly, the invention relates to an apparatus for supporting during such cutting keys or key blanks which include a blade having a lower portion which extends away from an upper portion at a predetermined relative angular orientation.

2. Description of Background Art

The prior art includes well known devices for cutting bit surfaces into the blade portion of a key blank. The bit surfaces are cut into the blade at positions which correspond to the positions of complimentary tumbler pins located in a lock, for example, a cylinder lock with a rotatable plug disposed in an outer shell. In such a cylinder lock, the tumbler pins, which extend through openings in the plug, must be raised (and rotated in a Medeco® brand high security cylinder lock with twisting pins) by the key to a shear line so as allow rotation of the plug within the shell. The level to which each tumbler pin must be moved by the key determines the depth of the corresponding bit surfaces cut in the key blade. Upon insertion of the key blade into the keyway of the lock, the bit surfaces engage and raise each tumbler pin to its proper position, thus allowing one to rotate the plug and operate the lock. The operation of such locks is well known in the art.

One type of apparatus for cutting a key blade utilizes a punch and die block to remove portions of the key blade to form the bit surfaces. Such apparatus typically comprise a base plate (lower jaw) and an upper plate (upper jaw) which clamp the key or a portion thereof to support same while the blade is being cut. The punch is moved downward toward the die block and punches out a portion of the key blade to form the desired bit surface(s). The die block is movable relative the key blade to form each bit of the series of bits which are disposed one after another along the length of the key blade. FIGS. 1 and 2 show a conventional key punch machine having a structure corresponding to that discussed above.

Prior art apparatus such as that shown in FIGS. 1, 2A, 2B and 3 support the key blank by engaging the tip stop and heel of the key blade to fix the position of the key blank in two directions. More particularly, the lower jaw 26 of prior art vises typically includes an abutment 29 which engages the tip stop T of the key blank 30 (located at the nose of the blade portion of the blank) to locate and secure the position of the blank 30 along a first direction X. See FIG. 2B. The lower jaw may also engage the shoulder S of the key blank (located at the juncture of the bow and blade portions of the blank) to securely locate the blank along the direction X. As described further below, the lower vise jaw 26 includes a corner formed by surfaces 27, 28 for supporting the lower portion of the key blank blade. The heel H of blank 30 (located at the longitudinal edge of the lower portion 36 of the blade) abuts vertical surface 28 of lower jaw 26 so as to secure the position of blank 30 along a second direction Y. See FIG. 3. In this manner, and due to upper jaw 22 being moved into engagement with the blank 30, the position of the blank is fixed with the lower jaw 26 abutting the tip stop T and heel H of the lower portion 36 of the blade of key blank 30. Securing the key blank as shown in FIG. 3 positions the upper portion 34 of same horizontally where it is engaged by the punch (not shown) in a substantially horizontal direction.

The use of specially-configured key slots with corresponding key profiles to provide restricted key systems is known in the art. U.S. Pat. No. 5,176,015 to Sussina discloses a restricted key system comprising a chevron-shaped key slot (keyway) and corresponding key blank. The blade of the key blank includes an upper planar portion and a lower planar portion joined at an intermediate portion which forms a horizontal ledge. The lower planar portion extends away from the intermediate portion at a predetermined angle with respect to a vertical axis extending downward through the upper portion, which angle may be in the range of approximately 5–85°.

The Sussina patent teaches that the angled or chevron-shaped keys of the restricted key system will enter no other key slot or keyway but their own, i.e., the 5° keys fit only the 5° key slots, the 10° keys the 10° slots, etc., and that the proprietary chevron-shaped key slots will block entry of all prior art keys. The patent also teaches that a family of key sections (for example all keys with a 10° angle) cannot be bitted (i.e., cut) by machines currently used by locksmiths or commercial key copiers.

Sussina teaches that the angled keys do not fit in and thus cannot be duplicated on conventional key cutting machines. Specifically, the lower angled leg of the key blank cannot be independently supported on key machine vises in current use, and even if the blank is supported on the vise, the cutter would produce bittings which are high on one side and would have to be finished by hand. As such, prior art apparatus are not able to suitably cut such angled keys.

Accordingly, there is a need in the art for an apparatus for supporting an angled or chevron-shaped key or key blank to facilitate proper cutting of bits in the blade thereof which avoids the problems present with prior art apparatus and produces consistent and accurate bit surfaces.

SUMMARY OF THE INVENTION

The present invention provides an apparatus and method for supporting angled or chevron-shaped keys or key blanks during cutting of the blade portions thereof. The angled or chevron shape is formed by the lower portion of the key blank which extends away from the upper portion of the blank at a predetermined angle. The apparatus for supporting the key blank includes upper and lower jaws which act as a vise to clamp the lower portion of the key blank blade therebetween. However, unlike prior art apparatus which locate the key blank on the lower jaw by positioning the heel of the blade against a vertical surface of the jaw (as described above), the invention utilizes the intermediate horizontal ledge portion of the blank to properly orient same on the lower jaw. Thus, the main support location for the key blank is at an intermediate point of the blank in that the horizontal ledge is located between the upper and lower portions of the blade. This feature permits various angled key blanks to be supported with the upper portions of the blades oriented substantially horizontally so as to be properly engaged by the key cutting mechanism. In particular, the height of the planar upper portions of various angled key blank blades is substantially equal, e.g., the distance from the intermediate ledge portion to the edge of the upper blade portion is the same for a 10° key blank and a 14° key blank. As such, locating the various key blanks on the lower vise jaw at the intermediate ledge portions of the blanks properly positions the upper blade portion for cutting regardless of the angle of the lower blade portion.

In a preferred embodiment, the lower jaw has a pair of support surfaces including a substantially vertical surface for abutting the intermediate ledge portion and a substantially flat surface extending away from the vertical surface in slanting fashion for engaging the planar lower blade portion. A predetermined angle is formed between the substantially flat surface of the lower jaw and a horizontal axis such that when the intermediate ledge portion abuts the vertical surface, the lower planar blade portion rests flush against the slanting flat surface to further support the blank during cutting thereof.

When the intermediate ledge portion of the blade abuts the vertical surface of the jaw, the upper portion of the key blade is disposed in a horizontal position and may be properly cut by the key cutting machine (which contacts the key blade in a direction perpendicular to the horizontal axis). The angle formed by the flat surface of the lower jaw and a horizontal axis is selected so as to correspond to the angle formed between the upper and lower portions of a particular angled key blank (e.g., 5°). Thus, a particular lower jaw corresponds to a particular angled key blank, while a different lower jaw corresponds to a different angled key blank, etc. In this manner, different lower jaws or support members may be provided for use with various angled key blank configurations. Thus, according to an aspect of the invention, a key cutting machine is capable of properly cutting a particular series or family of angled key blanks. This feature provides increased key control by way of the restricted angled support members because keys having a given angle can only be cut via a corresponding angled support. As the smallest increment of tumbler pin length used to provide key differs is 0.0125 inch, and an acceptable tolerance of the bitting surfaces of a key blade is ±0.001 inch, even slightly incorrect cuts will result in a key which does not operate the lock. Therefore, attempts to cut an angled key on a jaw support which is not specifically designed to support the key will be unsuccessful.

Thus, according to the invention, a university may have a restricted angled key system in which the key blades (and keyways of the locks) have a 10° angle. The university is thus provided with a key support apparatus of the present invention which properly supports 10° key blanks for cutting thereof. A hospital in the same locality may have a restricted key system in which the key blades have a 14° angle and, therefore, the hospital is provided with a support apparatus for 14° keys. As a result, not only do the university and hospital have a restricted key system, i.e., key blanks and keyways, they also have a restricted support apparatus for cutting the key blanks. Consequently, the university and hospital can each be confident that its keys cannot properly be cut on the other institution's key cutting machine.

The invention also provides preformed inserts which may be secured to the base member of a key cutting machine to provide the base member with a vertical portion for engaging the intermediate ledge portion of an angled key blank as discussed above. The inserts may be interchangeable to permit the key cutting machine to be adapted to cut chevron-shaped key blanks having various angles. Also, an insert may be provided for use with a conventional key cutting machine which is positioned on the bottom jaw of the machine to support and properly orient the key blank thereon.

BRIEF DESCRIPTION OF THE DRAWINGS

Additional features and advantages of the present invention will become apparent from the following detailed description of preferred embodiments taken in conjunction with the accompanying drawings, wherein:

FIG. 8 is a front elevation view, partly in section, or an apparatus for cutting key blanks according to a first embodiment of the present invention;

DETAILED DESCRIPTION OF PREFERRED EMBODIMENTS

Figure 1:
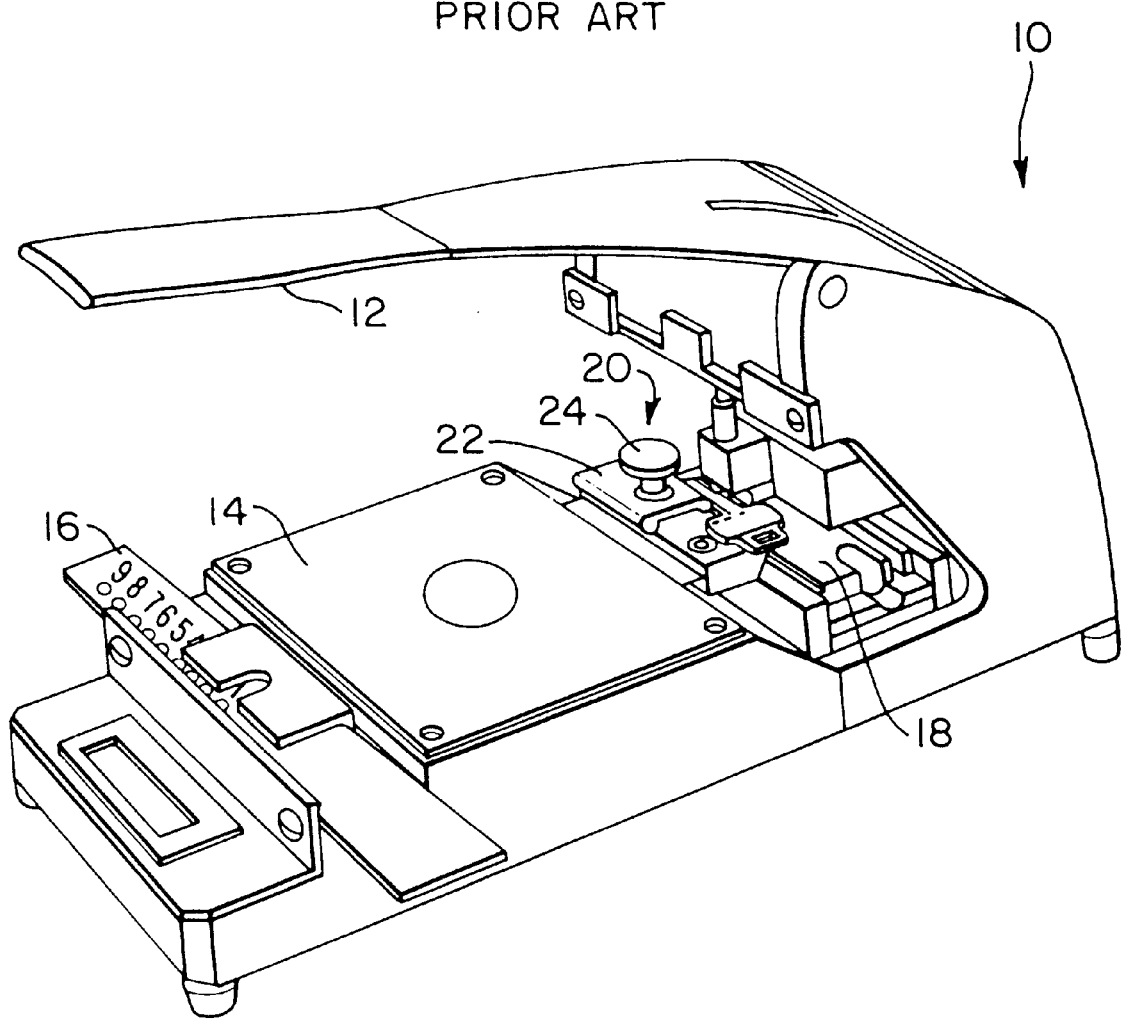
FIG. 1 is a perspective view of a conventional key punch machine for cutting bit surfaces in the blade of a key or key blan.
Figure 2A:
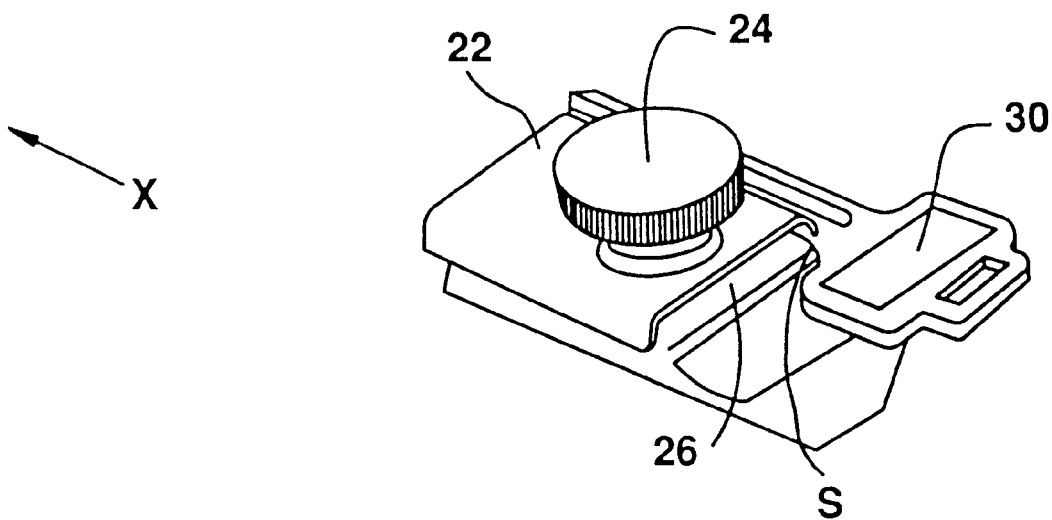
FIG. 2A is an enlarged view of a portion of the key punch machine depicted in FIG. 1.
Figure 2B:
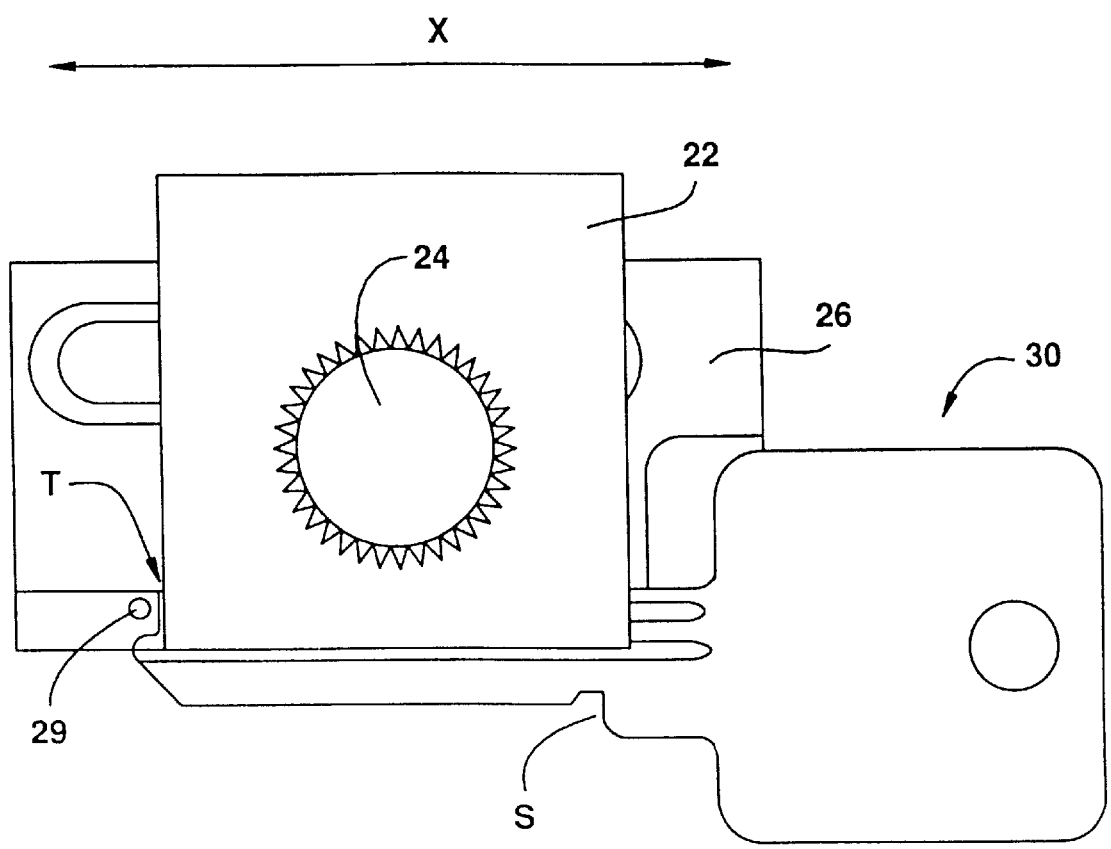
FIG. 2B is a plan view of the portion of the key punch machine shown in FIG. 2A.

FIG. 1 depicts a conventional key punch machine for cutting bit surfaces into the blade of a key blank. The key punch machine, indicated generally by reference numeral 10, includes a handle 12, a cover plate 14 and a keycut indicator 16. The punch includes a die carriage 18 which supports a die block on which the lower portion of the blade of the key blank is placed. The key blank is secured to the machine 10 by a vise 20 which includes an upper or top jaw 22 and a lower or bottom jaw 26 (FIG. 2). The blade of key blank 30 is clamped between the upper and lower jaws 22, 26, the upper jaw 22 being adjustable relative to the bottom jaw 26 via rotatable knob 24. A key punch mechanism is secured to one end of handle 12 and moves toward and away from the die located in carriage 18 upon actuation of handle 12. As is known in the art, the handle is moved downward to cause the punch mechanism to remove selected portions of the key blank blade to form bit surfaces. The carriage 18 permits the punch and die block to be moved relative to the secured key blank so that bit surfaces can be cut into the blade along the length thereof. The structure and function of such key punch machines are well known in the art and will not be described in further detail herein.

Figure 3:
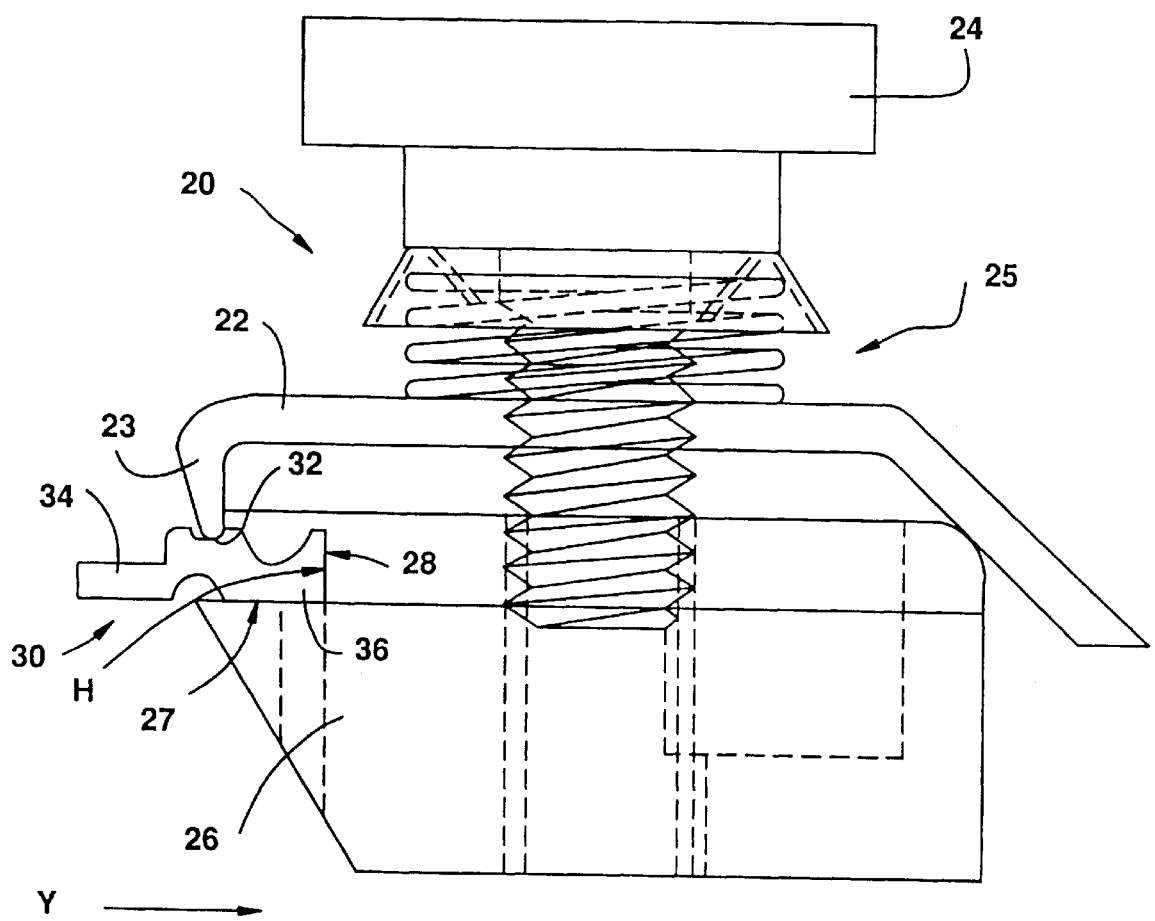
FIG. 3 is a side elevation view, partly in section, showing a flat key blank positioned in the machine of FIGS. 1 and 2.

As discussed above, FIG. 3 shows the manner in which a flat key 30 is secured to the vice 20 of a conventional key punch machine 10. The vice 20 includes an upper jaw 22 and a lower jaw 26. The upper jaw 22 is movable by a knob 24 and screw/spring assembly 25 so as to securely clamp the flat key between the respective jaws. The key blank 30 (shown resting on its side in FIG. 3) includes an upper portion 34, a lower portion 36 and a plurality of longitudinal grooves 32 which run along the length of the blade of the key blank. The upper portion 34 is configured or adapted to have portions thereof removed to form the aforesaid bit surfaces which operate the tumbler pins of a cylinder lock as is known in the art. Upper jaw 22 has a key engaging member 23 at one end thereof which is received in one of the grooves 32 of key blank 30. Lower jaw 26 includes a flat horizontal surface 27 and a flat vertical surface 28 which form a corner and the heel H of lower portion 36 of key blank 30 is positioned against the vertical surface 28. As seen in FIG. 3, knob 24 is actuated to thread upper jaw 22 toward lower jaw 26 to clamp key blank 30 firmly therebetween.

Figure 4:
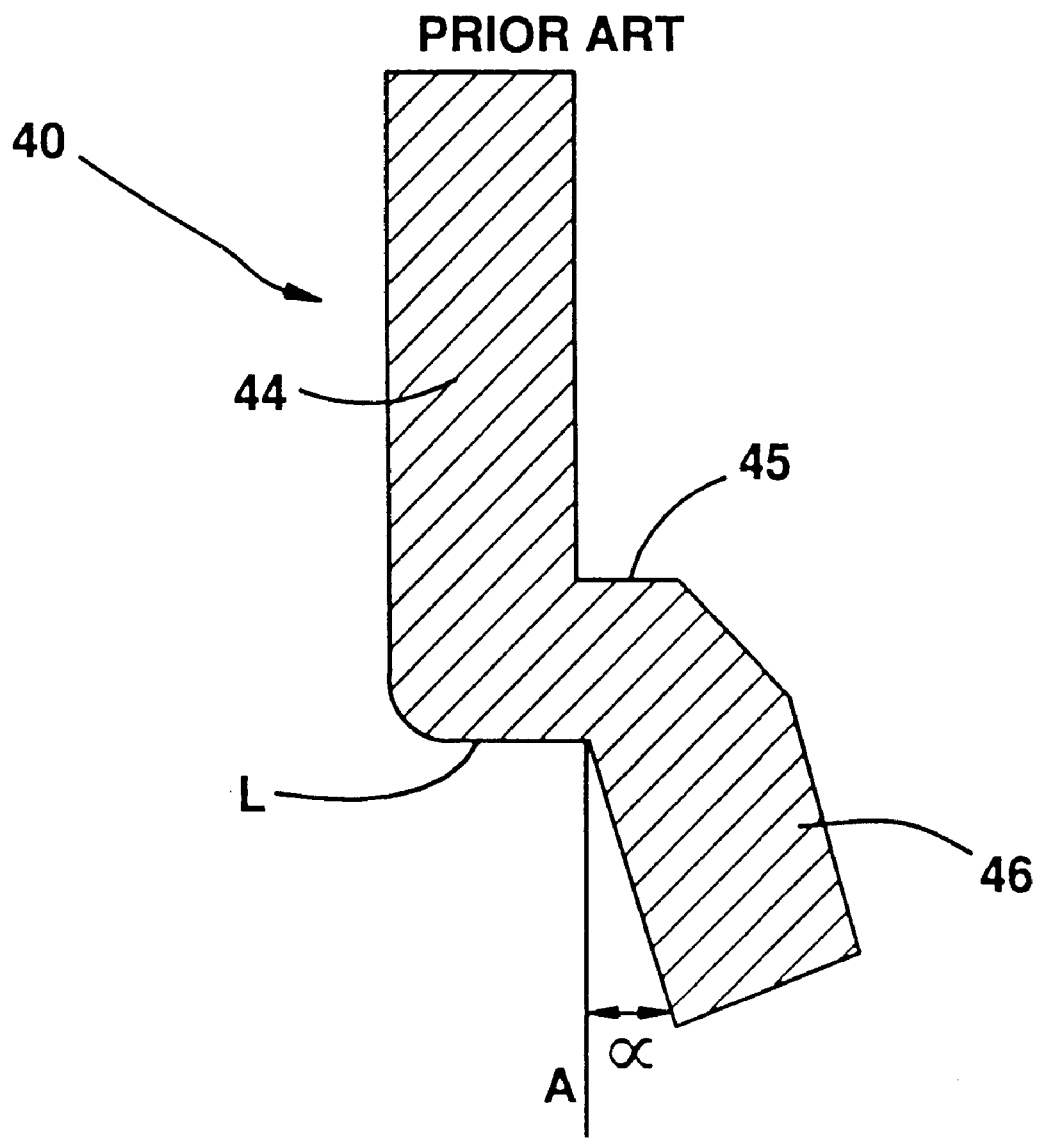
FIG. 4 is a sectional view of an angled key blank for use in a restricted key system.

FIG. 4 shows an angled key blank which includes an upper planar portion 44 and a lower planar portion 46 joined together by an intermediate portion which includes a surface 45 and a horizontal ledge portion L. The lower portion 46 extends away from upper portion 44 in an angled fashion so as to form an angle α between portion 46 and vertical axis A. The relative angular orientation of portions 44 and 46 provides the key blank 40 with a chevron-shaped configuration.

Figure 5:
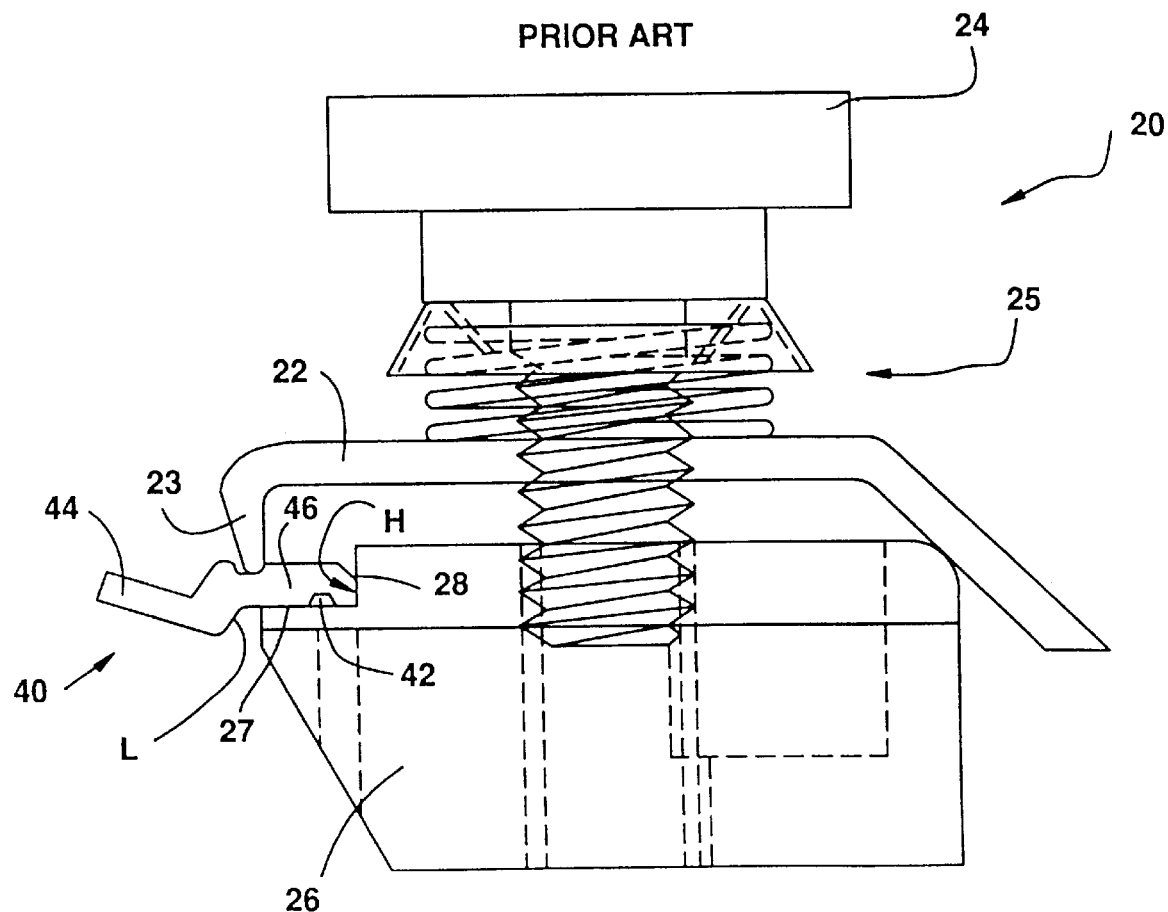
FIG. 5 is a side elevation view showing an angled key blank positioned in a key punch machine.

FIG. 5 shows the vice 20 of a conventional key punch machine 10 with the chevron-shaped key blank 40 of FIG. 4 located between the top and bottom jaws 22, 26. The lower planar portion 46 of key blank 40 is located on the jaw with the heel H abutting vertical surface 28 of lower jaw 26. However, as can be seen from FIG. 5, positioning heel H against surface 28 causes the upper planar portion 44 of key blank 40 to be skewed relative a horizontal axis. That is, upper planar portion 44 of key blank 40 is angled toward upper jaw 22 and thus is not parallel with flat horizontal surface 27 of lower jaw 26; and the intermediate ledge portion L is not supported by the jaw 26. The skewed or angled orientation of planar portion 44 prevents proper cutting of the bit surfaces into portion 44 and may even result in bending or distorting blade portion 44. The movable punch member of the key punch machine (not shown) is moved up and down in a generally linear direction which is perpendicular to flat surface 27 of lower jaw 26. Because the upper planar portion 44 is skewed relative to the direction of movement of the punch mechanism, the bit surfaces which are cut into portion 44 are not even though the cross section of the key blank. That is, the cut made by the punch mechanism or the bit surface cut by the punch mechanism extends through the cross section of the upper portion 44 in an angled manner such that the bit will be higher on one side than on the other. Such a result renders the cut key unacceptable for use in operating the lock because the skewed bit surface (48 in FIG. 7) will not properly engage the tumbler pins of the lock it was designed to operate. As such, in order to produce a useable key from key blank 40 using a conventional key punch mechanism, it is necessary to modify or finish the bit surfaces by hand once the key blank is removed (for example, by filing the bit surface to a flat condition).

Figure 6:
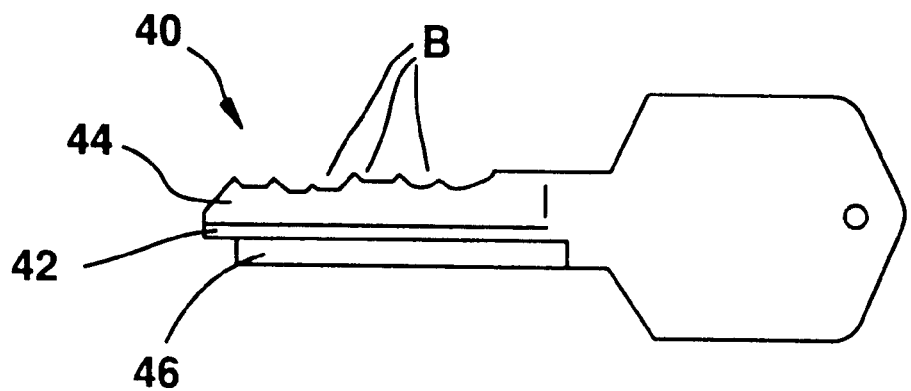
FIG. 6 is a side elevation view of an angled key blank which has bit surfaces cut in the blade by the machine of FIG. 5.
Figure 7:
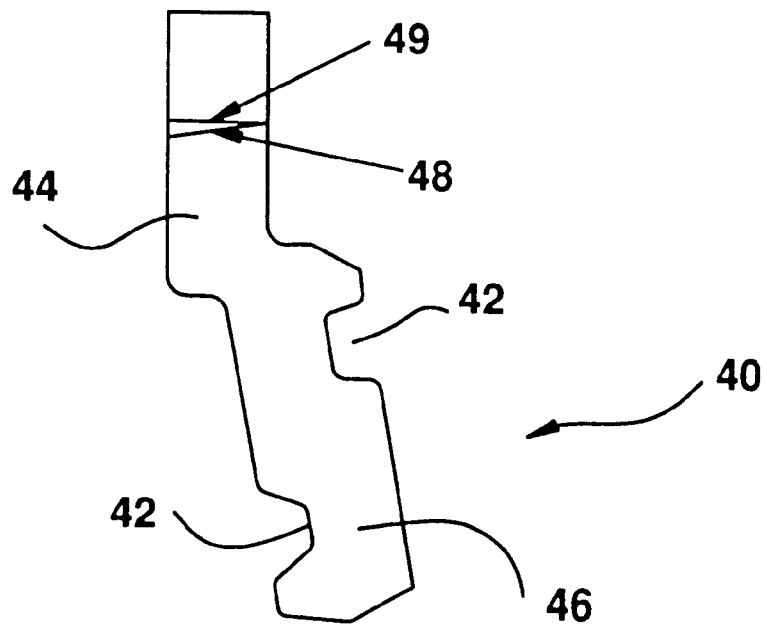
FIG. 7 is a front elevation view in section of the key blank of FIG. 6 showing a cut made by the key punch machine of FIG. 5 and a cut made by a key punch machine constructed according to the present invention.

FIG. 6 shows an angled key which has bit surfaces B cut into the upper planar portion 44 thereof by a conventional key cutting machine. However, as seen in FIG. 7, the bit surfaces B are skewed across the width of upper portion 44 of key 40 (as indicated by reference numeral 48). Reference numeral 49, on the other hand, shows a bit surface cut in a key blank by a key-cutting machine which supports the blank according to the present invention and correctly locates and properly orients the blank, as discussed below.

FIG. 8 shows a first preferred embodiment of the present invention which includes a vice 220 for securely holding an angled key blank 40 during the cutting of bit surfaces therein. The vice 220 includes an upper jaw 222 and a lower jaw 226. The upper jaw 222 is movable toward lower jaw 226 to clamp the key blank 40 therebetween in the manner discussed above with respect to FIGS. 1–3. The angled key blank 40 includes an upper planar portion 44 and a lower planar portion 46 which are disposed relative each other at a predetermined angle. The key blank includes grooves 42 which run along the length thereof and the forward clamping portion 223 of top jaw 222 is received in one of these grooves. The bottom jaw 226 of the invention is constructed so as to abut the horizontal ledge portion L and support the key blank in a manner which causes the upper planar portion 44 to be oriented horizontally relative to the lower jaw—and perpendicularly relative to the movement of the key punch mechanism. The lower jaw 226 preferably includes a substantially vertical portion 229 and a substantially flat surface 227 which extends away from portion 229 at an angle. The vertical portion 229 abuts the ledge portion L of key blank 40 as seen in FIG. 8 to properly locate and orient the blank with the upper portion therefore disposed horizontally. The flat surface 227 is preferably provided to support a side of lower blade portion 46.

Figure 9A:
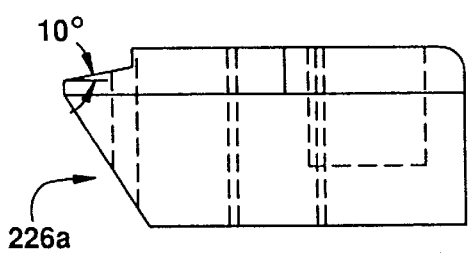
FIGS. 9A–9D are front elevation views of a plurality of bottom jaws for use in cutting angled key blanks having various angles.
Figure 9B:
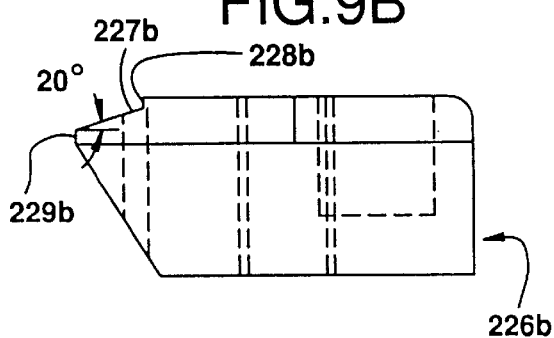
Figure 9C:
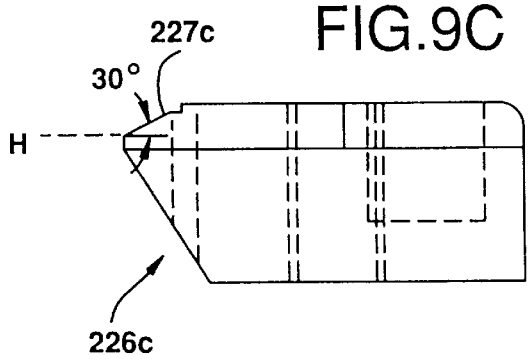
Figure 9D:
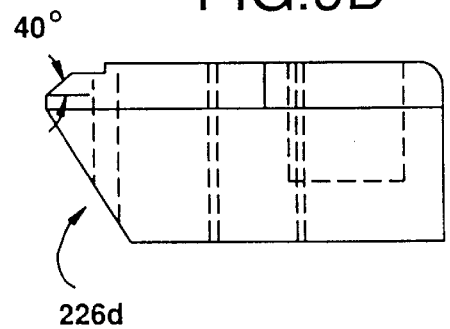

FIGS. 9A–9D depict variations of lower jaws useable with the vice 220 of FIG. 8. Referring to FIG. 9C, the substantially flat surface 227c is disposed relative to horizontal axis H at a desired angular orientation (30° in FIG. 9C). The lower jaws 226a–226c represent but a few of many possible variations of lower jaw constructions according to the present invention. The relative angular position of the flat slanting surface 227 is varied from lower jaw to lower jaw such that each lower jaw is suited for use in supporting a key blank having a specific angle between the upper and lower planar portions thereof. For example, the lower jaw 226a has a flat surface which is angled at 10° relative a horizontal axis and, as such, is designed to support a key blank in which the lower planar portion is angled away from the upper planar portion by 10°. In each case, when intermediate ledge portion L of key blank 40 is placed against lower jaw portion 229, the upper planar portion 44 of key blank 40 is disposed along the horizontal axis H and thus is properly oriented when engaged by the key punch mechanism. As a result, the bit surfaces (49 in FIG. 7) are cut in upper portion 44 in a straight and even manner so as to produce a key which will operate the lock for which it was designed without any difficulty.

Figure 10:
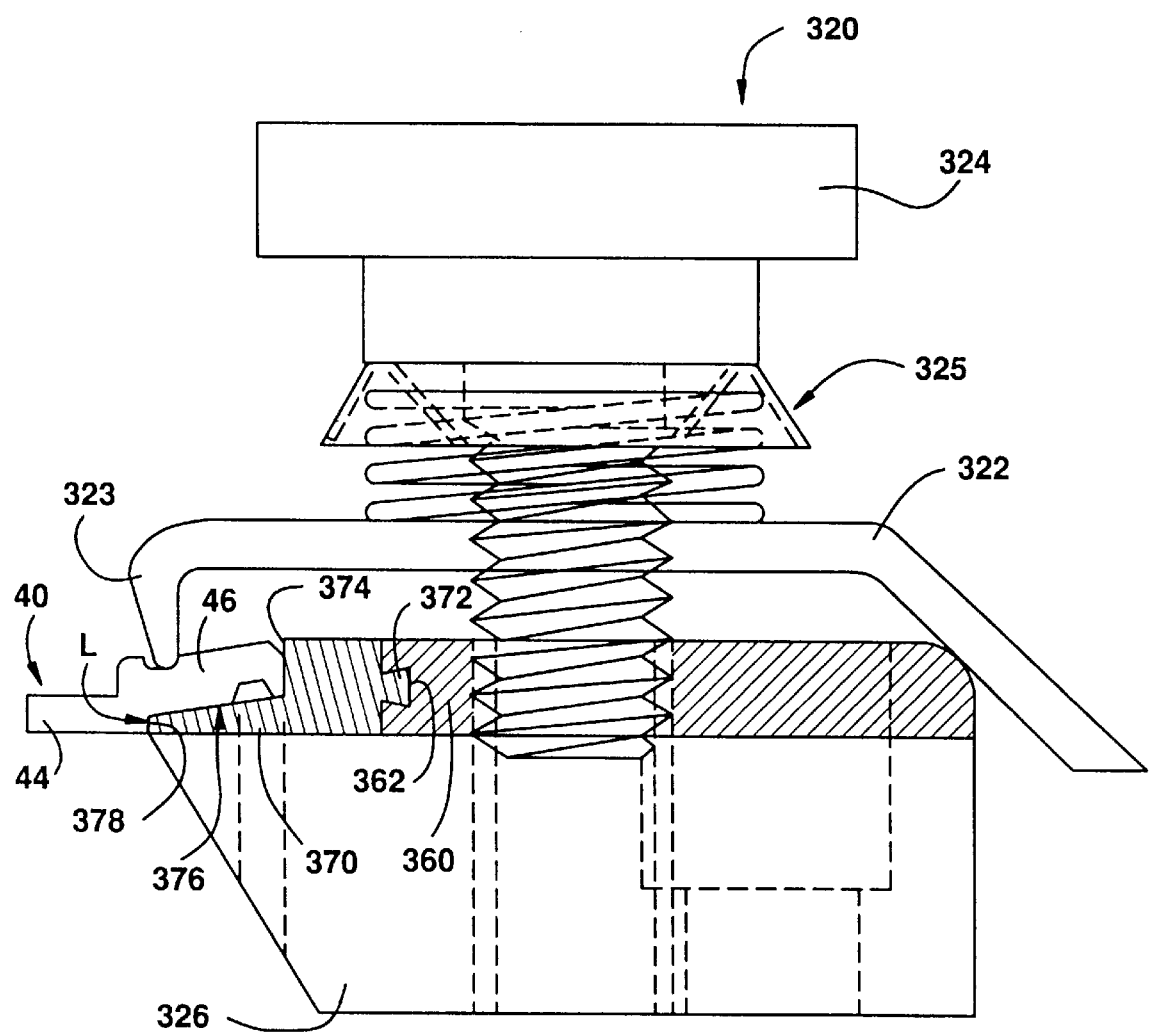
FIG. 10 is a front elevation view, partly in section, or an apparatus for cutting key blanks according to another embodiment of the present invention.
Figure 11A:
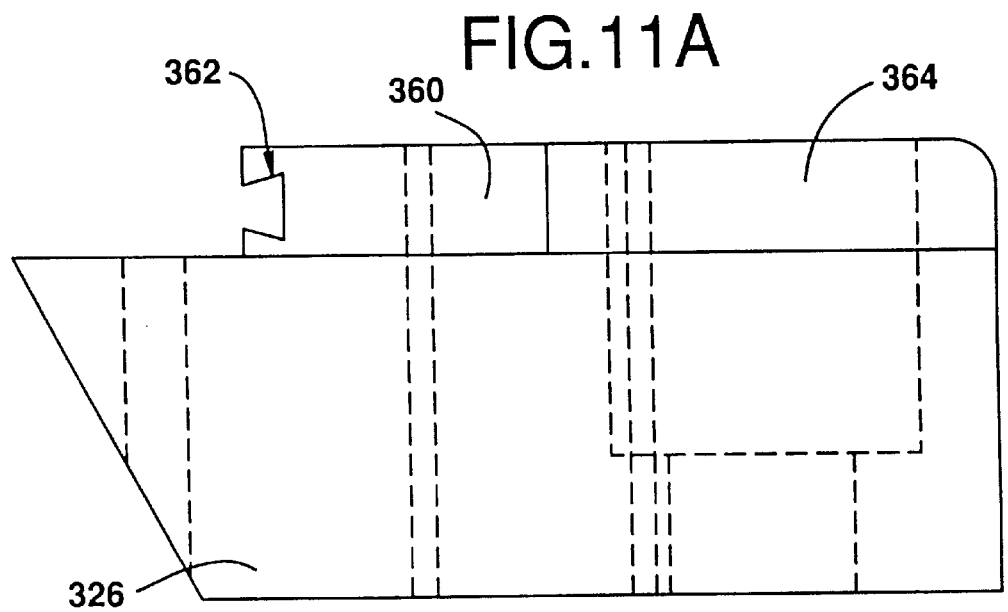
FIG. 11 is a front elevation view of a lower jaw and a plurality of inserts for use with the jaw in cutting angled key blanks having various angles.
Figure 11B:
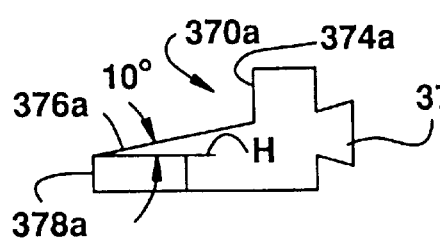
Figure 11C:
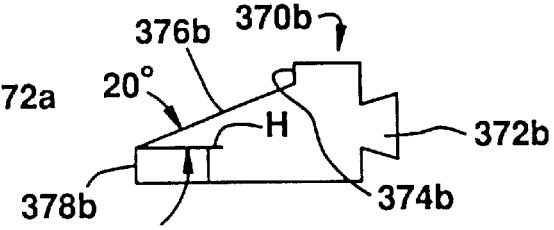
Figure 11D:
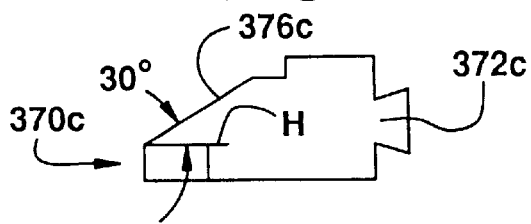
Figure 11E:
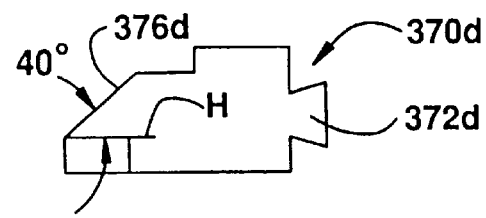

The embodiment of the invention shown in FIGS. 8 and 9a–9d includes a bottom jaw which is formed to support key blanks having a specific angled configuration. FIG. 10 depicts a further preferred embodiment of the present invention which includes a vice 320 for securely supporting a key blank during a cutting operation to place bits therein. The vice 320 has a structure similar to the vice of FIG. 8 in that it includes an upper jaw 322 and a lower jaw 326, as well as elements 324 and 325 which serve to adjustably force the upper jaw 322 toward lower jaw 326. The lower jaw 326, however, includes an upper portion 360 and an insert member 370. The upper portion 360 may be integrally formed with or attached to the lower jaw 326. However, insert 370 is removably attached to element 360 of lower jaw 326 so as to permit different inserts to be interchangeably attached to the single lower jaw. The insert member 370 includes a projection 372 which mates with a recess 362 formed in member 360 so as to securely fasten the components together. In FIG. 10, a dovetail type of connection is shown; however, any other suitable detachable connection means could be used, for example, screws, cam screws, set screws, nuts and bolts, a bayonet coupling, a tongue and groove connection, dowel pins, a magnetic connection, adhesives, etc.

The insert 370 includes a substantially vertical portion 378 and, in the most preferred embodiment, a substantially flat surface 376 which extends away from surface 378 at a predetermined angle. The vertical portion 378 abuts the intermediate ledge portion L located at the blank's midpoint between upper and lower planar portions 44, 46 of key blank 40 (as seen in FIG. 10). The lower planar portion 46 of key blank 40 may be positioned on flat surface 376 (and against vertical surface 374 if desired). Supporting the blank 40 at the intermediate ledge portion L positions upper planar portion 44 substantially horizontally so as to be properly engaged by the movable punch mechanism of the key punch machine. As discussed above, the predetermined angle that flat surface 376 extends away from a horizontal axis is selected such that a key having a particular angle between the upper and lower portions thereof may be supported with the upper portion oriented in a horizontal position as shown in FIG. 10 and the lower portion resting on surface 376.

The detachable insert 370 of the present invention forms part of a modular system of interchangeable inserts for use with the vice of a single key punch machine and permits a locksmith (or any other user) to cut various end user angled keys. FIG. 11 depicts a lower jaw 326 of the vice of a key punch machine, which lower jaw includes upper members 360 and 364. Although shown as two separate members, elements 360 and 364 could alternatively be a unitary member. The member 360 includes an opening or groove 362 as discussed above for detachably securing an insert to the lower jaw 326. FIG. 11 depicts four different insert members 370a–370d each of which may be detachably secured to lower jaw 326 via opening 362 and member 360. As mentioned above, any suitable detachable connecting means may be used to attach the insert 370 to the lower jaw 326. Each insert member 370 includes a vertical portion 378 and, preferably, a flat surface 376 which slants away from portion 378. The angle that flat surface 376 fords with horizontal axis H is selected based on the particular angled key for which it is designed to support, as described above in connection with the previous embodiments. Persons skilled in the art, of course, will recognize that FIG. 11 depicts but a few possible variations of the present invention. Further, while the preferred embodiments include a flat surface extending away from vertical portion 378 for supporting the side of blank portion 46, it should be recognized that such configuration is but a preferred embodiment and is not critical to the operation of the invention. Also, the support preferably, though not necessarily, includes a second vertical portion or surface 374 which abuts the heel H of the key blank to provide further stability and support during cutting thereof. Other manners of supporting the lower planar portion of the key blank in an angled fashion so as to orient the upper planar portion of the key blank substantially horizontally are within the scope of the present invention.

Figure 12:
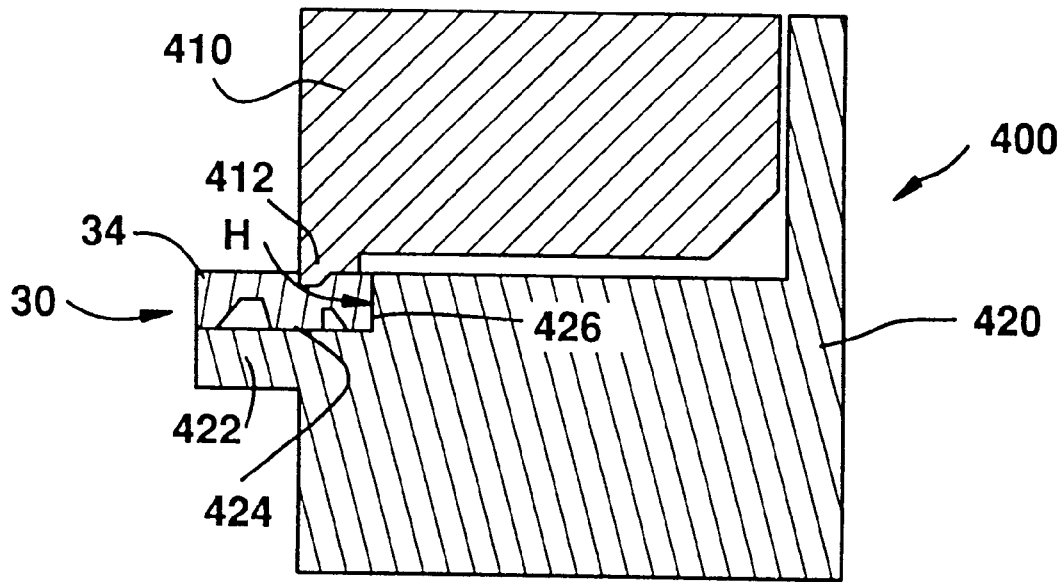
FIG. 12 is a sectional view of a portion of a conventional rotary key cutting machine with a flat key blank located between the clamping jaws of the machine.

FIG. 12 depicts a conventional rotary key cutting machine vise 400 which includes an upper jaw 410 and a lower jaw 420. A flat key blank 30 is located on an extension portion 422 of lower jaw 420 so that the heel H abuts surface 426 of the jaw. Upper jaw 410 includes a projection 412 which is received in a longitudinal groove of the key blank to clamp the key blank between the respective jaw members. The upper portion 34 of key blank 30 is configured to receive bit surfaces therein, which bit surfaces are cut by a rotary cutter wheel (not shown) which moves downward so as to cut into portion 34 of key blank 30. The placement of the heel H of an angled key blank against the surface 426 of the conventional lower jaw 420 will result in the upper portion of the key blank being skewed relative the horizontal axis (as in the case of a conventional key punch machine as discussed above).

Figure 13A:
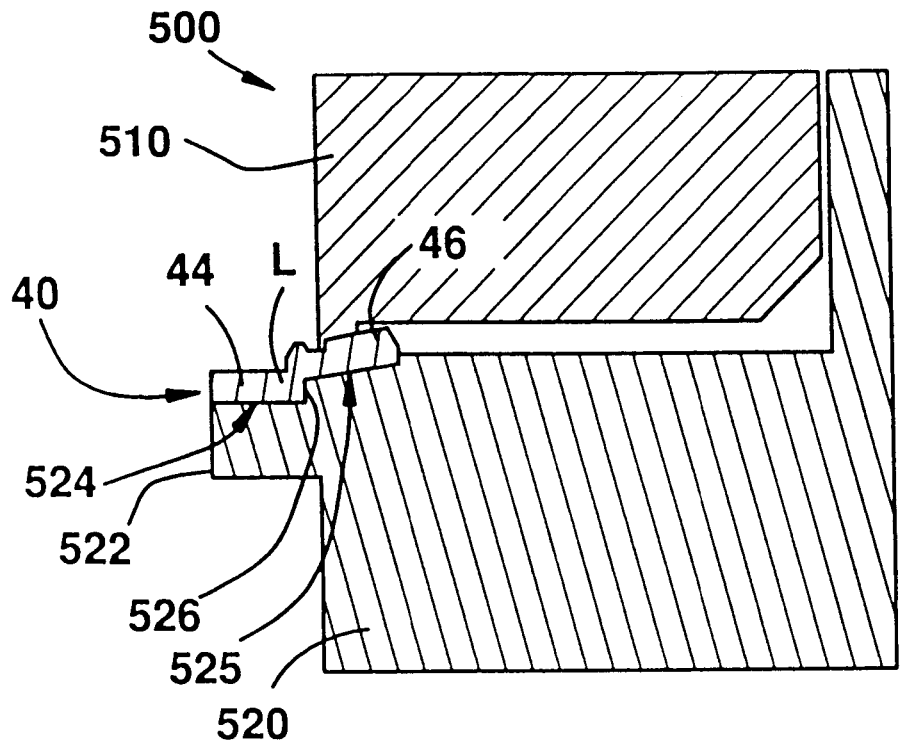
FIGS. 13A and 13B are sectional views of a portion of a rotary key cutting machine according to further embodiments of the present invention.
Figure 13B:
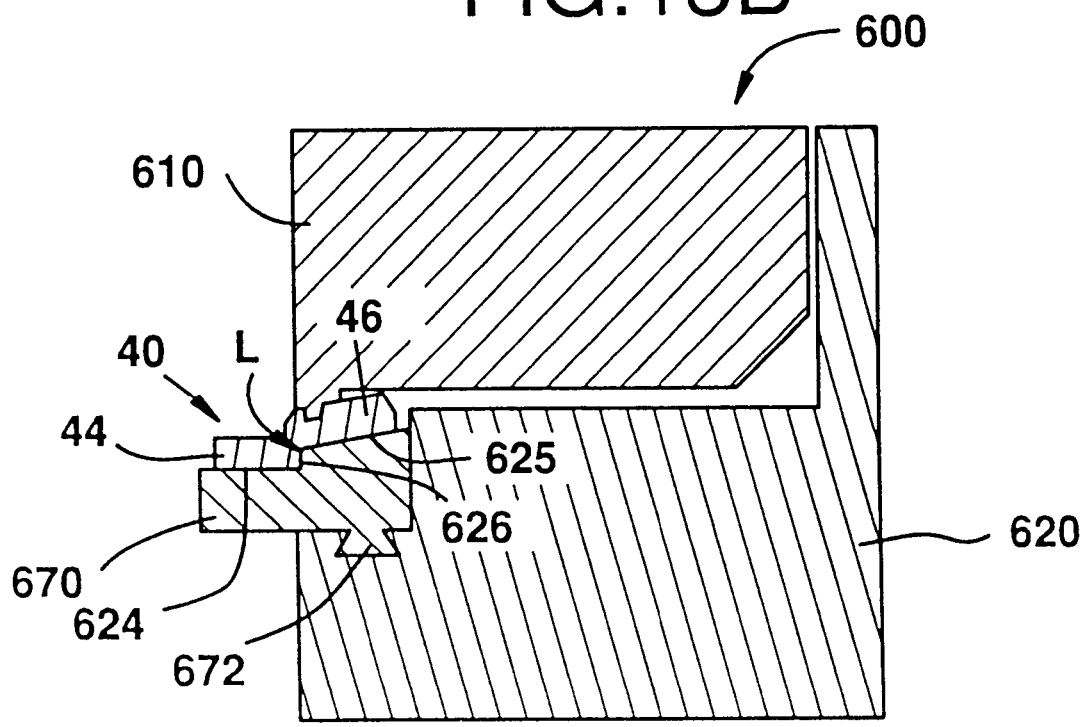

FIGS. 13A and 13B depict further preferred embodiments of the present invention in which the vise of a rotary key cutting machine properly supports an angled key blade so as to permit even bit surfaces to be cut therein. Specifically, vise portion 500 of a rotary key cutting machine includes upper jaw 510 and lower jaw 520. Lower jaw 520 includes a vertical portion or surface 526 for engaging and supporting the horizontal ledge portion L of the key blank 40. A flat sloping surface 525 is preferably provided and is angled relative horizontal by an angle sufficient to cause lower planar portion 46 of key blank 40 to rest flush thereon when ledge L abuts portion 526 so as to further support the blank. Also, a flat horizontal surface 524 is provided to support upper blank portion 44. The upper planar portion 44 of angled key blank 40 is thus properly oriented for engagement by the rotary cutter wheel (not shown).

FIG. 13B depicts yet another embodiment of the invention in which a vise portion 600 of a rotary key cutting machine includes upper and lower jaws 610, 620 which securely clamp a key blank 40 therebetween. Lower jaw 620 has a removable insert member 670 secured thereto to properly orient the angled key blank 40. The insert member 670 includes a vertical portion or surface 626 which supports the blank's intermediate horizontal ledge portion L as described above. The member 670 may also include a flat sloping surface 625 and a horizontal surface 624 similar to those shown in FIG. 13A. Upon positioning the ledge portion L of key blank 40 against portion 526, upper portion 44 of key blank 40 rests flush against surface 624 of the insert and is properly positioned in a horizontal manner for engagement by the rotary cutting wheel (not shown). The insert 670 can be detachably secured to lower jaw 620 by any of the suitable connecting means discussed above with previous embodiments, although FIG. 13B shows a dovetail connection similar to that shown in FIG. 10. The application of the invention to a rotary key cutting machine can be carried out in the manner described above with respect to a key punch machine. That is, a plurality of lower jaw members for a rotary key cutting machine can be provided for accommodating chevron-shaped keys having various angles between the portions thereof, or the lower jaw of the rotary key cutting machine may be configured as shown in FIG. 13B so as to form part of a modular system including interchangeable inserts having various angles which permit he lower jaw to be used to support chevron-shaped keys having various angles. While preferred embodiments of the present invention have been discussed in connection with a key punch machine and a rotary key cutting machine, persons skilled in the art will appreciate that the principles of the invention may be applied to any key cutting or duplicating mechanism or apparatus.

Figure 14:
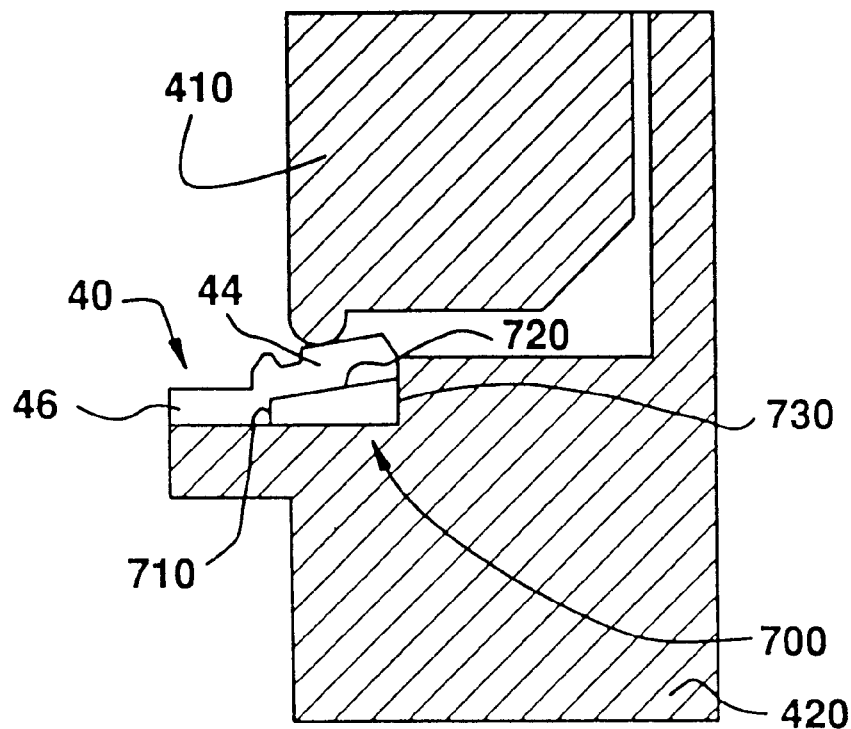
FIG. 14 is a sectional view of a portion of a conventional key cutting apparatus modified according to another embodiment of the present invention to permit cutting of angled keys.

FIG. 14 shows yet another preferred embodiment of the present invention in which vise portion 400 of a conventional rotary key cutting machine has been retrofitted to support angled key blanks. The vise includes upper jaw 410 and lower jaw 420, the lower jaw defining a right angle corner formed by a flat horizontal surface and a flat vertical surface as discussed with respect to FIG. 12. According to the present invention, a removable insert 700 (which optionally may be permanently affixed to the lower jaw) in the form of a generally wedge-shaped member is provided. The insert 700 has a vertical portion or surface 710 which supports the intermediate ledge portion L of the key blank as discussed above. The insert 700 also may include a flat surface 720 for engaging a side of the blank portion 44 and a vertical surface 730 for abutting the jaw 420. The angular orientation of the flat surface 720 is selected to facilitate its use with a key blank 40 having a particular angled configuration. When the intermediate ledge portion L of key blank 40 is supported by portion 720 of insert 700, upper blank portion 46 is positioned horizontally so as to be properly engaged by the rotary cutting wheel. Thus, the embodiment of FIG. 14 provides an apparatus which may be incorporated into or used with existing key cutting machines so as to render them useable for properly cutting angled key blanks without substantial structural modification of the machine. While the invention has been discussed above with regard to cutting key blanks, it will be appreciated that key blank refers to not only a blank which is completely uncut, i.e., has no bit surfaces therein, but also to a key which may already have bit surfaces located therein but is cut to either modify existing bit surfaces or provide additional bit surfaces.

It is apparent that the present invention provides an apparatus and process for supporting the intermediate horizontal ledge portions of various angled key blanks so as to orient the blanks in a proper position to facilitate accurate cutting of bit surfaces therein via any suitable key cutting or duplicating apparatus. As such, the present invention overcomes the deficiencies of the prior art and permits bit surfaces to be cut into chevron-shaped key blanks having different angles, e.g., within the range of 5–85°, in an easy and efficient manner. Further, as discussed above, the invention provides increased key control via the restricted angled supports used to cut the restricted angled key blanks.

The invention may be practiced with many different types of key-cutting machines and provides great flexibility in that conventional machines may be upgraded or retrofitted to cut angled key blanks. Also, different supports may be provided for cutting different angled key blanks, or a single support may be provided as part of a modular system which includes interchangeable inserts for use in cutting different angled key blanks.

While the present invention has been described in detail in connection with preferred embodiments thereof, other variations and modifications of the invention will be readily apparent to those skilled in the art and, accordingly, the above description in no way limits the scope of the present invention.

What is claimed is:

1. An apparatus for supporting a key blank having an angled blade which includes an upper portion and a lower portion which is angled away from the upper portion at a predetermined angle, said apparatus comprising:

a support member for engaging the lower portion of the key blank;

wherein the support member includes a substantially vertical portion and a substantially flat surface which is slanted relative the substantially vertical portion, and the substantially flat surface forms an angle with a horizontal axis which is in the range of from about 5° to about 85°; and wherein the angle formed between the substantially flat surface of the support member and said horizontal axis substantially corresponds to a predetermined angle formed between an upper portion and a lower portion of an angled key blank thereby permitting the lower portion of the key blank to rest on the substantially flat surface of the support member with the upper portion of the key blank disposed substantially horizontally;

wherein the support member includes a base member and a separate insert secured thereto, and the separate insert includes the substantially vertical portion and the substantially flat surface; and further comprising a plurality of separate inserts each being securable to the base member, each of said inserts including a substantially vertical portion and a substantially flat surface, and wherein the angle formed between the horizontal axis and the substantially flat surface is different for each of said plurality of inserts.

2. A modular system for use in supporting any of a plurality of corresponding key blanks, the key blanks each including a blade with an upper portion and a lower portion which extends away from the upper portion at a predetermined relative angular orientation which is different for each of said plurality of key blanks, said system comprising:

a plurality of support members for engaging the lower portion of the key blank;

wherein each support member includes a substantially vertical surface for engaging each key blank intermediate the upper and lower portions thereof, and a substantially flat surface which slants away from the substantially vertical surface and forms a predetermined angle with a horizontal axis, and wherein the angle formed between the horizontal axis and the substantially flat surface is different for each of said plurality of support members;

wherein the angle formed between the horizontal axis and the substantially flat surface of each support member substantially corresponds to a predetermined angle formed between an upper portion and a lower portion of one of a plurality of angled key blanks; and wherein each support member has means for being secured to a key rutting machine; and wherein the lower portion of one of said key blank is positionable on one of the support members with the upper portion of the key blank disposed substantially horizontally.

3. An apparatus according to claim 2, wherein the angle formed between the horizontal axis and the substantially flat surface of each support member is in the range of from about 5° to about 85°.

* * * * *